United States Patent
Metzger et al.

(10) Patent No.: US 11,117,485 B2
(45) Date of Patent: Sep. 14, 2021

(54) METHOD FOR CHARGING AN ENERGY STORAGE ELEMENT OF A VEHICLE USING A MODULAR CHARGING APPARATUS WITH HIGH OVERALL EFFICIENCY

(71) Applicant: Dr. Ing. h.c. F. Porsche Aktiengesellschaft, Stuttgart (DE)

(72) Inventors: Christian Metzger, Tamm (DE); Karsten Hähre, Dudenhofen (DE); Steven De Jongh, Königsbach-Stein (DE); Marija Jankovic, Stuttgart (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 173 days.

(21) Appl. No.: 16/295,338

(22) Filed: Mar. 7, 2019

(65) Prior Publication Data
US 2019/0283619 A1 Sep. 19, 2019

(30) Foreign Application Priority Data
Mar. 14, 2018 (DE) .......................... 102018105841.1

(51) Int. Cl.
| | |
|---|---|
| *H02J 7/00* | (2006.01) |
| *B60L 53/62* | (2019.01) |
| *H02J 1/10* | (2006.01) |
| *H02M 3/142* | (2006.01) |

(Continued)

(52) U.S. Cl.
CPC .............. *B60L 53/62* (2019.02); *B60L 53/11* (2019.02); *B60L 53/22* (2019.02); *H02J 1/102* (2013.01);
(Continued)

(58) Field of Classification Search
CPC .......... B60L 53/62; B60L 53/11; B60L 53/22; B60L 2210/10; B60L 2240/549;
(Continued)

(56) References Cited

U.S. PATENT DOCUMENTS

| | | | |
|---|---|---|---|
| 6,154,381 A | 11/2000 | Kajouke et al. | |
| 6,166,934 A | 12/2000 | Kajouke et al. | |

(Continued)

FOREIGN PATENT DOCUMENTS

| | | |
|---|---|---|
| DE | 102004013243 A1 | 10/2005 |
| DE | 112008001665 T5 | 7/2010 |

(Continued)

OTHER PUBLICATIONS

Australian Examination Report for Australian Application No. 2018282349, dated Nov. 21, 2019, 4 pages.

(Continued)

*Primary Examiner* — Zixuan Zhou
(74) *Attorney, Agent, or Firm* — RatnerPrestia

(57) ABSTRACT

A method for charging an energy storage element of a vehicle using a charging apparatus which provides a charging current ($I_L$) and a charging voltage (U) at an operating point. The charging apparatus has a plurality of energy supply modules connected in parallel, having the following method steps: in an optimization step, a distribution of the charging current ($I_L$) to the energy supply modules connected in parallel, in the case of which the charging apparatus has a maximum overall efficiency, is respectively determined for a plurality of predefined operating points; in a charging step which follows the optimization step, a distribution of the charging current ($I_L$) to the individual energy supply modules of the charging apparatus, in the case of which the charging apparatus has a maximum overall efficiency, is selected on the basis of a predefined charging current ($I_L$) and a predefined charging voltage (U).

12 Claims, 5 Drawing Sheets

(51) Int. Cl.
    *B60L 53/10* (2019.01)
    *B60L 53/22* (2019.01)

(52) U.S. Cl.
    CPC ............... *H02J 7/00* (2013.01); *H02J 7/007* (2013.01); *H02M 3/142* (2013.01); *B60L 2210/10* (2013.01); *B60L 2240/527* (2013.01); *B60L 2240/529* (2013.01); *B60L 2240/547* (2013.01); *B60L 2240/549* (2013.01); *Y02T 90/12* (2013.01)

(58) Field of Classification Search
    CPC ......... B60L 2240/527; B60L 2240/529; B60L 2240/547; B60L 53/00; B60L 53/14; H02J 7/00; H02J 1/102; H02J 7/007; H02J 1/10; H02J 7/0052; H02M 3/142; Y02T 90/12; Y02T 90/14; Y02T 10/7072; Y02T 10/92; Y02T 10/70; Y02T 10/72
    USPC ............................................. 701/22; 320/109
    See application file for complete search history.

(56) References Cited

U.S. PATENT DOCUMENTS

| | | | |
|---|---|---|---|
| 6,184,661 B1 * | 2/2001 | Becker | H02P 9/30 322/25 |
| 7,895,455 B2 | 2/2011 | Green et al. | |
| 2010/0332873 A1 | 12/2010 | Munjal et al. | |
| 2013/0085623 A1 | 4/2013 | Izumisawa et al. | |
| 2014/0340041 A1 * | 11/2014 | Aggeler | H02J 7/02 320/109 |
| 2018/0050597 A1 | 2/2018 | Hand, III et al. | |
| 2018/0262018 A1 | 9/2018 | Satoh et al. | |

FOREIGN PATENT DOCUMENTS

| | | |
|---|---|---|
| DE | 112012004063 T5 | 7/2014 |
| EP | 1143591 A2 | 10/2001 |
| EP | 1578010 A2 | 9/2005 |
| EP | 2485349 A1 | 8/2012 |
| EP | 2624400 A1 | 8/2013 |
| EP | 2777129 B1 | 9/2016 |
| EP | 3088989 A1 | 11/2016 |
| WO | 2017094247 A1 | 6/2017 |

OTHER PUBLICATIONS

European Search Report for European Application No. 18020605.4, dated May 28, 2019 with translation, 10 pages.

* cited by examiner

| T | M1 | M2 | M3 | M4 | M5 | M6 | M7 |
|---|----|----|----|----|----|----|----|
| 1 | ✓ | ✓ | ✓ | ✓ | ✓ | ✓ | ⊘ |
| 2 | ✓ | ✓ | ✓ | ✓ | ✓ | ⊘ | ✓ |
| 3 | ✓ | ✓ | ✓ | ✓ | ⊘ | ✓ | ✓ |
| 4 | ✓ | ✓ | ✓ | ⊘ | ✓ | ✓ | ✓ |
| 5 | ✓ | ✓ | ⊘ | ✓ | ✓ | ✓ | ✓ |
| 6 | ✓ | ⊘ | ✓ | ✓ | ✓ | ✓ | ✓ |
| 7 | ⊘ | ✓ | ✓ | ✓ | ✓ | ✓ | ✓ |

METHOD FOR CHARGING AN ENERGY STORAGE ELEMENT OF A VEHICLE USING A MODULAR CHARGING APPARATUS WITH HIGH OVERALL EFFICIENCY

CROSS-REFERENCE TO RELATED APPLICATION

This application claims priority to German Patent Application No. DE 10 2018 105 841.1, filed Mar. 14, 2018, which is incorporated by reference herein in its entirety.

FIELD OF THE INVENTION

The invention relates, to a method for charging an energy storage element of a vehicle using a charging apparatus which provides a charging current and a charging voltage at an operating point, wherein the charging apparatus has a plurality of energy supply is modules connected in parallel. The method can be used to charge electric vehicles or plug-in hybrid vehicles, for example.

BACKGROUND OF THE INVENTION

In the case of a charging apparatus of the type mentioned at the outset, a plurality of energy supply modules are connected in parallel, with the result that the output currents provided by the energy supply modules are added to the charging current of the charging apparatus. The efficiency of an energy supply module depends on the output current of the respective energy supply module and the charging voltage of the charging apparatus. If the charging current or the charging voltage now changes during the charging of the energy storage element, the overall efficiency of the charging apparatus also changes.

In principle, it is desirable to operate the charging apparatus in such a manner that its overall efficiency is as high as possible. Against this background, it would be desirable to make it possible to operate a charging apparatus having a plurality of energy supply modules connected in, parallel with high overall efficiency.

SUMMARY OF THE INVENTION

In view of the foregoing, a method for charging an energy storage element of a vehicle using a charging apparatus which provides a charging current and a charging voltage at an operating point is proposed, wherein the charging apparatus has a plurality of energy supply modules connected in parallel, having the following method steps:

(a) in an optimization step, a distribution of the charging current to the energy su ply modules connected in parallel, in the case of which the charging apparatus has a maximum overall efficiency, is respectively determined for a plurality of predefined operating points;

(b) in a charging step which follows the optimization step, a distribution of e charging current to the individual energy supply modules of the charging apparatus, in the case of which the charging apparatus has a maximum overall efficiency, is selected on the basis of a predefined charging current and a predefined charging voltage.

According to aspects of the invention, a plurality of possible operating points of the charging apparatus, that is to say a plurality of combinations of charging current and charging voltage, are considered in the optimization step. A distribution of the charging current to the individual energy supply modules, in the case of which the overall efficiency of the charging apparatus, that is to say the efficiency of the parallel circuit of the energy supply modules, is at a maximum, is respectively determined for the operating points considered. In the charging step, on the basis of the desired operating point, that is to say on the basis of the desired charging current and the desired charging voltage, the distribution which has been determined for this operating point in the optimization step is then selected. This makes it possible to always operate the charging apparatus with high overall efficiency when charging the energy storage element of the vehicle, for example a battery or a rechargeable battery.

The optimization step is preferably carried out before the energy storage element is charged, that is to say before the energy storage element is connected to the charging m apparatus. In this respect, the optimization step can be carried out in advance, with the result that only a selection from the previously determined current distributions can be made during the actual charging in the charging step.

In an approximation step preceding the optimization step, one advantageous configuration provides for an approximation of the efficiency of an individual energy supply module to be determined on the basis of an output, voltage and an output current of the energy supply module. Providing this approximation makes it possible to specify an approximate efficiency of an individual energy supply module for any desired combinations of output voltage and output current of the energy supply module.

It is preferred if, in the approximation step, the approximation is carried out by means of linear approximation or quadratic approximation or cubic approximation.

In a measurement step preceding the approximation step, one advantageous configuration provides for the efficiency of the energy supply module to be determined for a plurality of module operating points, wherein the module operating points each comprise an output voltage and an output current of the energy supply module. The efficiency of the energy supply module can be determined as the quotient of the output power and input power of the energy supply module. The measurement step is preferably carried out as part of a charging operation preceding the current charging step, for example during the preceding charging of another energy storage element of another vehicle. Optionally, the efficiency of the energy supply module determined in the measurement step for a plurality of module operating points can be stored in a module memory of the energy supply module. In order to reduce the memory requirement, supporting points, for example for a Newton approximation, can be stored in the module memory in the measurement step.

It has proved to be advantageous if a number of active energy supply modules is determined in the optimization step, wherein the active energy supply modules have an identical output current. Such a configuration entails the advantage that the energy supply modules can be set to an identical operating point, that is to say can receive an identical specification for an output current and an output voltage, and only the number of active energy supply modules must be set. Such a configuration is advantageous, in particular, when the charging apparatus has structurally identical energy supply modules.

In this context, it is preferred if, in the optimization step, the distribution of the charging current to the active energy supply modules is determined on the basis of the determined number of active energy supply modules by means of a gradient method. The equal division of the charging current to a determined number of active energy supply modules can be used as a starting point. On the basis of this starting point, the distribution of the charging current to the individual energy supply modules can be optimized by means of the gradient method.

One advantageous configuration provides for a table to be created in the optimization step, which table comprises a distribution of the charging current to the energy supply modules connected in parallel for different operating points, wherein the selection is made in the charging step on the basis of the table. In this respect, a distribution of the charging current to the individual energy supply modules, in the case of which a maximum overall efficiency of the charging apparatus can be achieved, can be stored in the table for each operating point. A calculation is not required in the charging step. Rather, a corresponding distribution of the charging current to the individual energy supply modules can be read from the table on the basis of the desired operating point and can be set. The distribution stored in the table may comprise, for each energy supply module, a partial charging current allocated to the energy supply module, wherein the partial charging currents are identical or different. Although the use of such a table requires a certain amount of memory, it entails the advantage that only a small amount of computing effort arises in the charging step.

An alternatively advantageous configuration provides for the distribution of the charging current to the individual energy supply modules to be selected in the charging step by means of a classifier, in particular a decision tree classifier. For example, the classifier can determine a number of active energy supply modules, in particular wherein the active energy supply modules have an identical output current. The classifier is preferably trained in a training step between the optimization step and the charging step.

According to one advantageous configuration, the actual overall efficiency of the charging apparatus is determined in the charging step. In order to determine the overall efficiency of the charging apparatus, the charging current and the charging voltage can be measured. In addition, input voltages and input currents of the energy supply modules connected in parallel can be measured. Determining the actual overall efficiency of the charging apparatus makes it possible to determine a difference between the maximum of the overall efficiency determined in the optimization step and the actual overall efficiency.

According to one advantageous configuration, the actual efficiency of the individual energy supply modules is determined in the charging step. In order to determine the efficiency of the individual energy supply modules, the output current and the output voltage of the energy supply modules can be measured. In addition, input voltages and input currents of the energy supply modules connected in parallel can be measured. Alternatively, a plurality of measurements of the charging current and the charging voltage of the charging apparatus can be carried out, in which case different energy supply modules are activated and the output current and the output voltage and/or the efficiency of the individual energy supply modules are determined from these measurements. Determining the actual efficiency of the energy supply modules makes it possible to determine the quality of the individual energy supply modules and/or to observe an aging behavior of the individual energy supply modules and/or to predict possible failures of individual energy supply modules.

The energy supply modules connected in parallel preferably have a DC-DC converter. The output current and the output voltage of the energy supply module can be provided via an output of the DC-DC converter.

The energy supply modules can preferably provide an output current in the range of 0 A to 100 A, particularly preferably 0 A to 50 A. The output voltage of the energy supply modules, and therefore the charging voltage, can preferably be set in a range of between 0 V and 1000 V, for example in a range of between 0 V and 950 V.

BRIEF DESCRIPTION OF THE DRAWINGS

Further details and advantages of the method, according to aspects of the invention be described below on the basis of the exemplary embodiments shown in the figures in which.

DETAILED DESCRIPTION OF THE INVENTION

Figure 1:
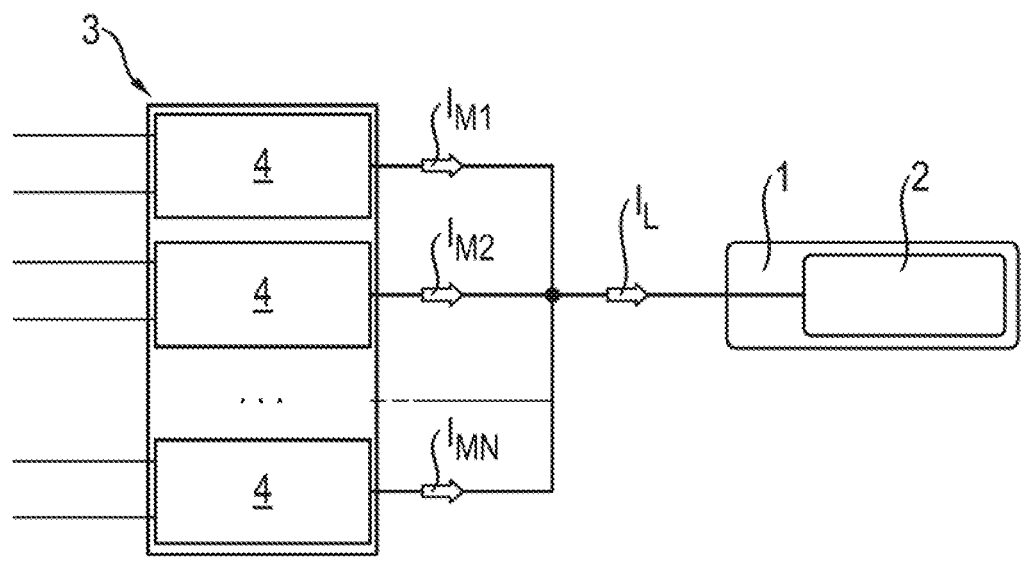
FIG. 1 shows a block diagram of a modular charging apparatus or charging an energy storage element of a vehicle.

FIG. 1 illustrates a block diagram of an exemplary embodiment of a charging apparatus 3 which is suitable for charging an energy storage element 2 of a vehicle 1, for example an electric vehicle or a plug-in hybrid vehicle. The charging apparatus 3 has a plurality of structurally identical energy supply modules 4 which are connected in parallel. The energy supply modules 4 each comprise a DC-DC converter, via the output of which an output current $I_{M1}$, $I_{M2}$, $I_{MN}$ and an output voltage U are provided. In this respect, for the purpose of charging the energy storage element 2, the charging apparatus 4 can provide a charging current $I_L$ which is in the form of a direct current and corresponds to the sum of, the output currents $I_{M1}$, $I_{M2}$, $I_{MN}$ of the energy supply modules 4. The charging apparatus 3 according to the exemplary embodiment is in the form of a DC voltage high-power charging apparatus and can provide a charging current $I_L$ in the range of 0 A to 500 A for a charging voltage U of 0 V to 1000 V.

Figure 2:
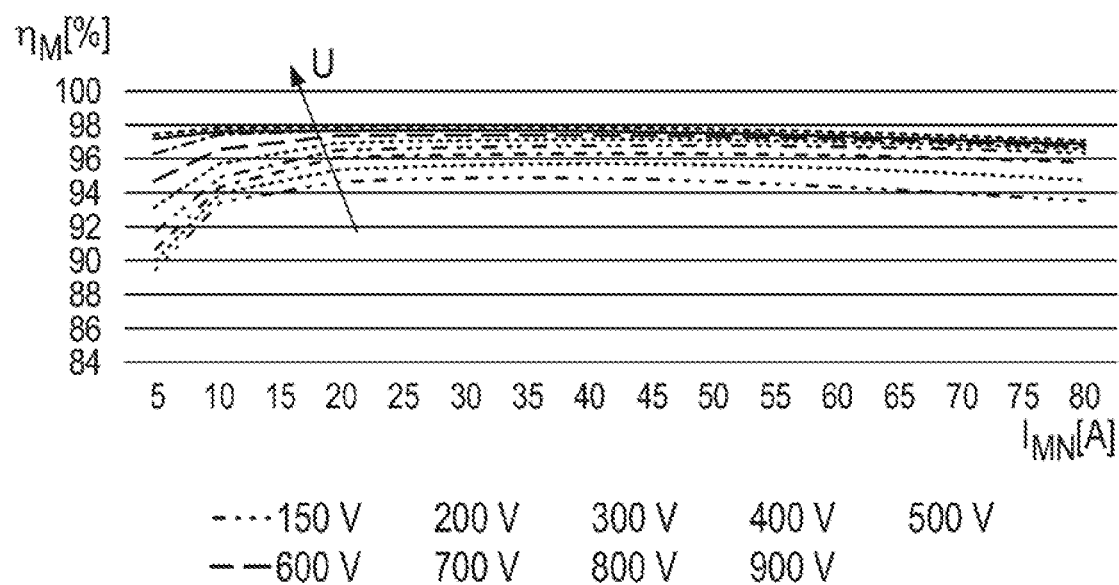
FIG. 2 shows a diagram of the efficiency of an energy supply module of the charging apparatus from FIG. 1 on the basis of the output voltage and output current of the energy supply module.

FIG. 2 illustrates, by way of example, the efficiency $\eta_N$ of an energy supply module 4 on the basis of the output current $I_{MN}$ and the output or charging voltage U. It can be seen that the efficiency $\eta_N$ initially assumes a maximum with increasing output current $I_{MN}$ an then decreases as the output current $I_{MN}$ increases further. In addition, the efficiency $\eta_N$ increases with increasing output or charging voltage U.

Since it is desirable, when operating the charging apparatus 3, for the overall efficiency of the latter to be as high as possible, the charging apparatus 3 is operated using a method according to one exemplary embodiment of the invention. In this method, a distribution of the charging current $I_L$ to the energy supply modules 4 connected in parallel, in the case of which the charging apparatus 3 has a maximum overall efficiency, is respectively determined in an optimization step for a plurality of predefined operating points. In a charging step which follows the optimization step, a distribution of the charging current $I_L$ to the individual energy supply modules 4 of the charging apparatus 3, in the case of which the charging apparatus 3 has a maximum overall efficiency, is then selected on the basis of a predefined charging current $I_L$ and a predefined charging voltage U. This method shall be explained below on the basis of the illustrations in FIGS. 3, 4 and 5.

Figure 3:
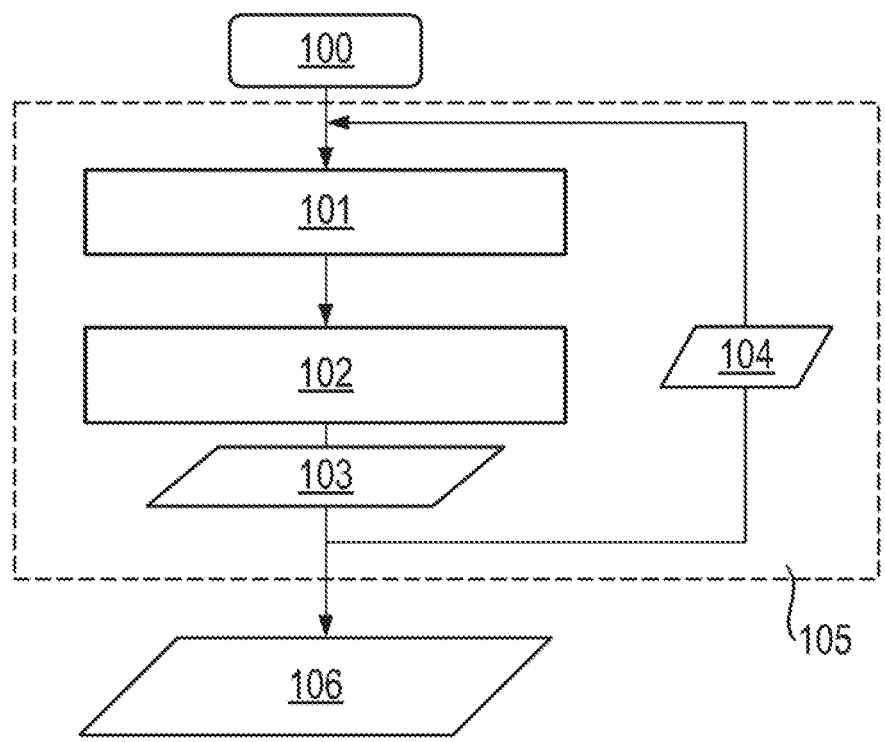
FIGS. 3 and 4 show flowcharts of the method steps of a method for charging an energy storage element of a vehicle which are carried out before charging.

FIG. 3 shows a first flowchart of an optimization step 105 of the method which is preferably carried out before the actual charging of the energy storage element 2. This means that this method step can be carried out before an electrical connection is established between the charging apparatus 3 and the energy storage element 2 of the vehicle 1. An approximation step which is not illustrated in FIG. 3 and in which an approximation of the efficiency $\eta_N$ of an individual energy supply module 4 is determined on the basis of the output voltage U and the output current $I_{MN}$ of the energy supply module 4 is carried out before this optimization step 105. In a measurement step which precedes the approximation step and which is likewise not shown in FIG. 3, the efficiency $\eta_N$ of the energy supply module 4 is determined for a plurality of module operating points. These module operating points are each defined by an output voltage U and an output current $I_{NM}$. The approximation step 105 is carried out in order to also be able to specify the efficiency $\eta_N$ of the energy supply module 4 for those module operating points for which no measurements were carried out in the measurement step. The approximation can be carried out, for example, by means of linear approximation or quadratic approximation or cubic approximation, in which case these possibilities will also be discussed.

In the approximation step 105, losses for a predefined charging voltage U and a predefined charging current $I_L$ are first of all approximated in a first sub-step 101 on the basis of measurement data relating to the output voltage U, the output current $I_{NM}$ and the efficiency $\eta_N$ of the energy supply modules 4. In a second sub-step 102, an optimization is carried out for this operating point, and a distribution of the charging current $I_L$ to the energy supply modules 4 connected in parallel, in the case of which the overall efficiency of the charging apparatus 3—that is to say the parallel circuit of the energy supply modules 4—is at a maximum, is determined as the result 103 of said optimization. This determination can be carried out using methods of linear or non-linear, in particular quadratic, programming or symmetrical loss calculation or genetic algorithms. The first sub-step 101 and the second sub-step 102 are carried out iteratively for a plurality of operating points, cf. loop 104. A distribution of the charging current $I_L$ to the energy supply modules 4 connected in parallel, in the case of which the charging apparatus 3 has a maximum overall efficiency, is respectively provided for a plurality of predefined operating points as the result 105 of the optimization step 105.

Figure 4:
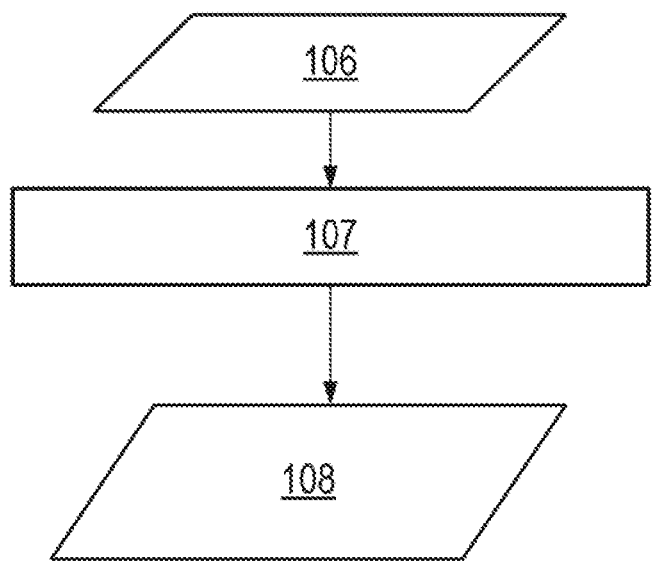

FIG. 4 shows a training step 107 which is preferably carried out before the actual charging of the energy storage element 2. On the basis of the distribution determined in the optimization step 105, that is to say the result 106 of the optimization for a plurality of operating points of the charging apparatus 3, a classifier which can be used to select the suitable distribution during charging is trained in the training step 107. As the result 108 of the training step 107, the trained classifier is stored in the charging apparatus 3, in particular in a memory unit of the charging apparatus 3. Alternatively, the result 106 of the optimization can be stored in a table which can be read during subsequent charging. According to another alternative, the optimization step 105 can be carried out during the charging of the energy storage element 2. In this respect, the optimization step 105 and the charging step can be carried out while the energy storage element 2 is connected to the charging apparatus 3.

The sequence of the exemplary embodiment of the method shall now be described on the basis of the illustration in FIG. 5 if the energy storage element 2 is connected to the charging apparatus 3. On the basis of a starting state 109, the classifier is initialized in a configuration step 110. This can be carried out, for example, by reading the result 108 of the training step 107 from a memory unit of the charging apparatus 3. A loop variable is set to a starting value in an initialization step 111.

In a query step 112, the current operating point of the charging apparatus 3 is determined, that is to say the actual charging current $I_L$ and the actual charging voltage U. In a charging step 113 which follows the query step 112, a distribution of the charging current $I_L$ to the individual energy supply modules 4 of the charging apparatus 3, in the case of which the charging apparatus 3 has a maximum overall efficiency, is selected on the basis of the charging current and the charging voltage U. This distribution is preferably selected by means of the classifier which was trained in the training step 107 and can be in the form of a decision tree classifier, for example. Alternatively, the selection can be made by reading a table stored in the charging apparatus 3.

Figure 5:
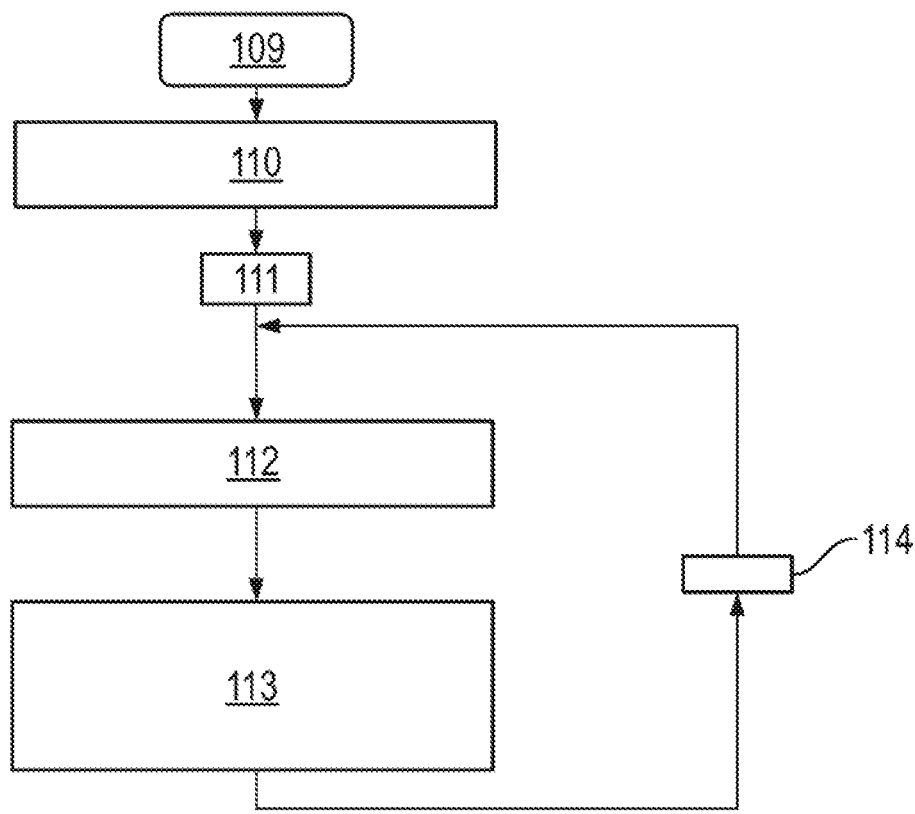
FIG. 5 shows a flowchart of the charging step of a method for charging an energy storage element of a vehicle.

As indicated by the loop 114 in FIG. 5, the query step 112 and the charging step 113 are periodically repeated, with the result that the distribution of the charging current Ii to the energy supply modules 4 can accordingly be tracked in the event of any changes to the operating point of the charging apparatus 3.

Figure 6:
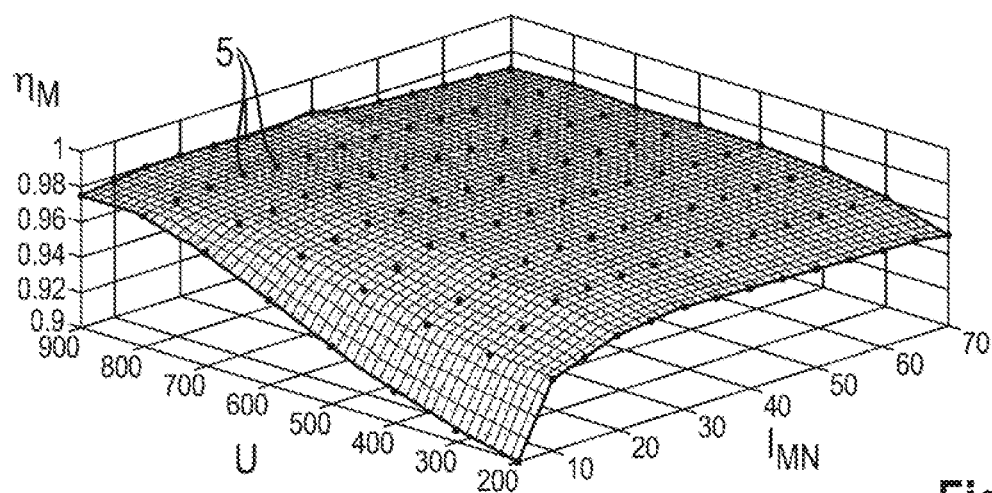
FIG. 6 shows a diagram of an exemplary efficiency of an energy supply module on the basis of the output voltage and output current.

FIG. 6 illustrates a plurality of measured values of the efficiency of an energy supply module 4 on the basis of the output voltage U and output current $I_{MN}$ of the energy supply module 4, as can be determined in a measurement step of the method according to aspects of the invention, for example.

Figure 7:
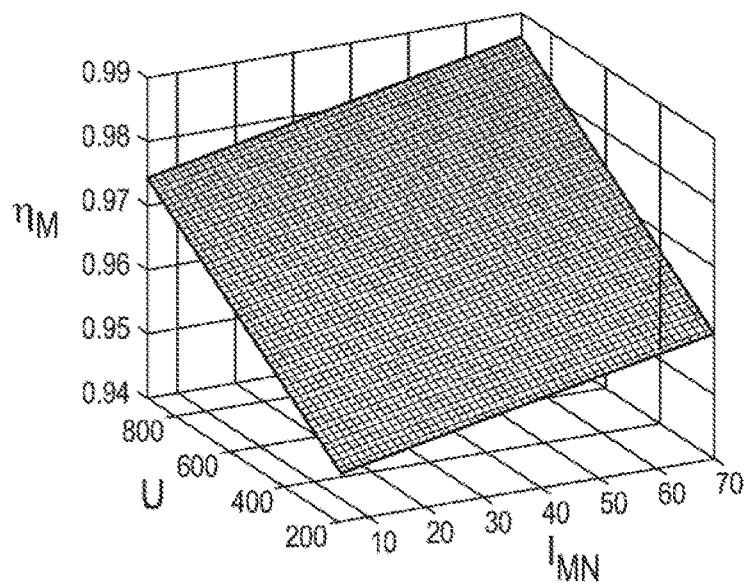
FIG. 7 shows a linear approximation of the efficiency from FIG. 6.
Figure 8:
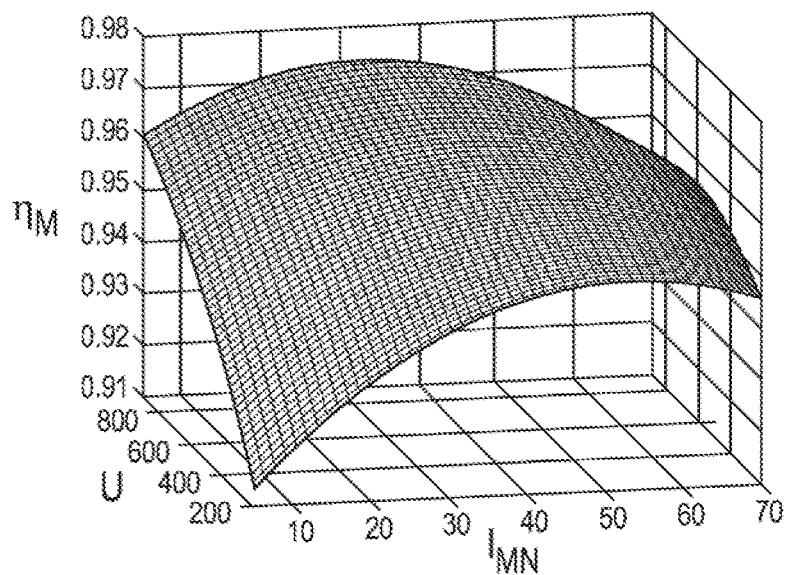
FIG. 8 shows a quadratic approximation of the efficiency from FIG. 6.
Figure 9:
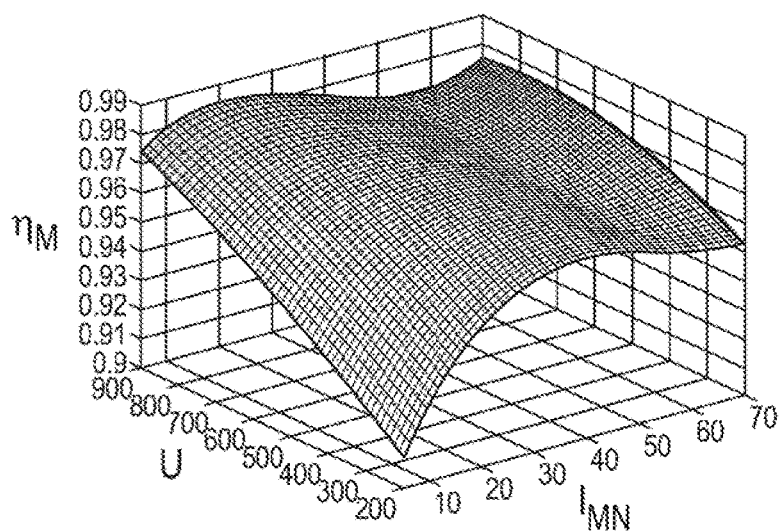
FIG. 9 shows a cubic approximation of the efficiency from FIG. 6.

FIG. 7 shows a linear approximation of the efficiency from FIG. 6. FIG. 8 illustrates a quadratic approximation of the efficiency from FIG. 6 and FIG. 9 illustrates a cubic approximation of the efficiency from FIG. 6.

Figures 10, 11:
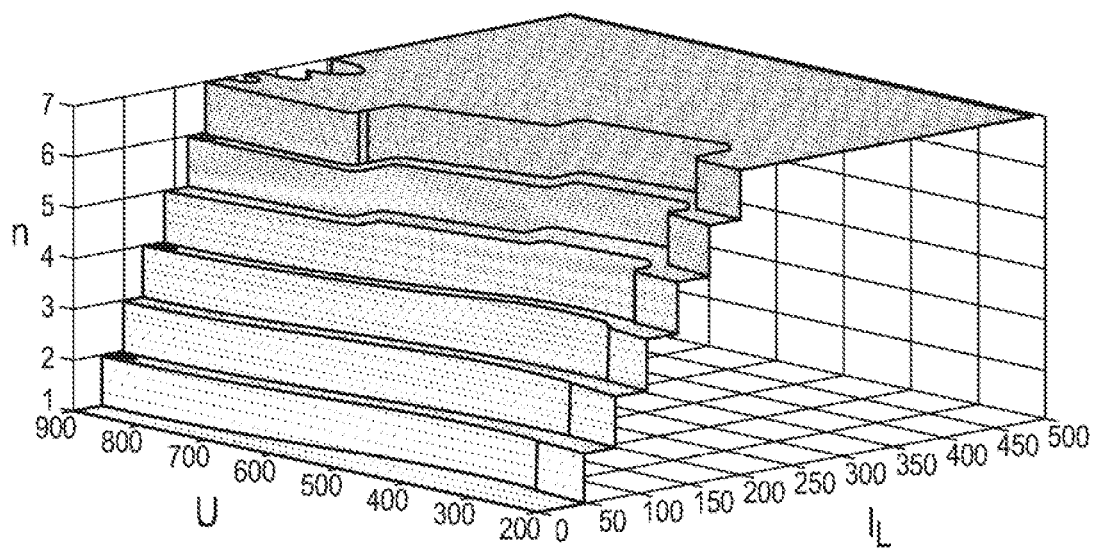
FIG. 10 shows a three-dimensional illustration of a table which comprises a distribution of the charging current to the energy supply modules connected in parallel for different operating points.
FIG. 11 shows a test plan for determining the efficiency of an energy supply module on the basis of measurements of the charging current and the charging voltage of the charging apparatus.

FIG. 10 shows a three-dimensional representation of a table having approximately 1400×4900 entries, in which the optimization result determined in the optimization step 105 is included, wherein a number n of active energy supply modules 4 which, disregarding aging effects and component tolerances, have an identical output current $I_{M1}$, $I_{M2}$, $I_{MN}$ is determined in the optimization step 105. In this respect, the charging current $I_L$ is equally distributed to a number n of active energy supply modules 4. Therefore, only the number n of active energy supply modules 4 must be stored in the table.

In the exemplary embodiment of the method according to aspects of the invention, the actual overall efficiency of the charging apparatus 3 or the actual efficiency of the individual energy supply modules 4 can be optionally determined in the charging step 113. In order to determine the efficiency $\eta_N$ of the individual energy supply modules 4, a plurality of measurements of the charging current $I_L$ and of the charging voltage U of the charging apparatus 3 can be carried out, wherein different energy supply modules 4 are activated. The output current $I_{MN}$ and the output voltage U and/or the efficiency $\eta_N$ of the individual energy supply modules 4 can then be determined from these measurements. A possible sequence plan for such a measurement sequence is shown using the example of a charging apparatus 3 having a total of seven energy supply modules M1, M2, M3, M4, M5, M6, M7 in FIG. 11. In this case, the operating state of the individual energy supply modules M1, M2, M3, M4, M5, M6, M7 in seven successive time steps T is illustrated, wherein, a check indicates an active energy supply module M1, M2, M3, M4, M5, M6, M7 and a crossed-out circle indicates an inactive energy supply module M1, M2, M3, M4, M5, M6, M7. After these seven measurements have been carried out, the efficiency of each individual energy supply module M1, M2, M3, M4, M5, M6, M7 can be calculated. Determining the actual efficiency of the energy supply modules M1, M2, M3, M4, M5, M6, M7 makes it possible to determine the quality of the individual energy supply modules M1, M2, M3, M4, M5, M6, M7 and/or to observe an aging behavior of the individual energy supply modules M1, M2, M3, M4, M5, M6, M7 and/or to predict possible failures of individual energy supply modules M1, M2, M3, M4, M5, M6, M7.

What is claimed is:

1. A method for charging an energy storage element of a vehicle using a charging apparatus which provides a charging current ($I_L$) and a charging voltage (U) at an operating point, wherein the charging apparatus has a plurality of energy supply modules connected in parallel, said method comprising:

in an optimization step, the method comprises distributing the charging current to the energy supply modules connected in parallel, wherein the charging apparatus has a maximum overall efficiency that is respectively determined for a plurality of predefined operating points; and in a charging step which follows the optimization step, the method comprises distributing the charging current ($I_L$) to the individual energy supply modules of the charging apparatus, wherein the charging apparatus has a maximum overall efficiency that is selected on the basis of a predefined charging current ($I_L$) and a predefined charging voltage (U), wherein, during the charging step, the method comprises selecting the distribution of the charging current to the individual energy supply modules using a decision tree classifier.

2. The method as claimed in claim 1, wherein, in an approximation step preceding the optimization step, the method comprises determining an approximation of an efficiency ($\eta_N$) of an individual energy supply module on a basis of an output voltage (U) and an output current ($I_{M1}$, $I_{M2}$, $I_{MN}$) of the energy supply module.

3. The method as claimed in claim 2, wherein, in the approximation step, the approximation is carried out by linear approximation or quadratic approximation or cubic approximation.

4. The method as claimed in claim 2, wherein, in a measurement step preceding the approximation step, the method comprises determining the efficiency ($\eta_N$) of the energy supply module for a plurality of module operating points, wherein the module operating points each comprise an output voltage (U) and an output current ($I_{M1}$, $I_{M2}$, $I_{MN}$) of the energy supply module.

5. The method as claimed in claim 1, wherein the method comprises determining a number of active energy supply modules in the optimization step, wherein the active energy supply modules have an identical output current ($I_{M1}$, $I_{M2}$, $I_{MN}$).

6. The method as claimed in claim 5, wherein, in the optimization step, the method comprises determining the distribution of the charging current to the active energy supply modules on a basis of the determined number of active energy supply modules using a gradient method.

7. The method as claimed in claim 1, wherein the method comprises determining an actual overall efficiency of the charging apparatus during the charging step.

8. The method as claimed in claim 1, wherein the method comprises determining an actual efficiency ($\eta_N$) of the individual energy supply modules during the charging step.

9. The method as claimed in claim 1, wherein the optimization step is carried out before the vehicle storage element is connected to the charging apparatus.

10. The method as claimed in claim 1, wherein the optimization step is continued during the charging step.

11. The method as claimed in claim 1, wherein in the optimization step, the method comprises distributing the charging current to the energy supply modules connected in parallel in a sequential fashion.

12. The method as claimed in claim 1, wherein the predefined operating points comprise different combinations of charging currents and charging voltages.

* * * * *